United States Patent [19]
Greineder et al.

[11] Patent Number: 6,137,909
[45] Date of Patent: Oct. 24, 2000

[54] SYSTEM AND METHOD FOR FEATURE SET REDUCTION

[75] Inventors: Stephen G. Greineder, Providence, R.I.; Tod E. Luginbuhl, Waterford, Conn.; Roy L. Streit, Portsmouth, R.I.

[73] Assignee: The United States of America as represented by the Secretary of the Navy, Washington, D.C.

[21] Appl. No.: 08/502,741

[22] Filed: Jun. 30, 1995

[51] Int. Cl.[7] .............................. G06K 9/46; G06K 9/62
[52] U.S. Cl. ......................... 382/190; 382/224; 382/228
[58] Field of Search .................................. 382/190, 224, 382/228, 160, 225, 226

[56] References Cited

U.S. PATENT DOCUMENTS

| | | | |
|---|---|---|---|
| 4,661,913 | 4/1987 | Wu | 364/500 |
| 5,343,537 | 8/1994 | Bellegarda | 382/187 |
| 5,392,363 | 2/1995 | Fujisaki | 382/187 |
| 5,479,523 | 12/1995 | Gaborski | 382/159 |
| 5,491,758 | 2/1996 | Bellegarda | 382/187 |
| 5,544,257 | 8/1996 | Bellegarda | 382/187 |
| 5,544,261 | 8/1996 | Bellegarda | 382/187 |
| 5,590,261 | 12/1996 | Sclaroff | 395/173 |

*Primary Examiner*—Bhavesh Mehta
*Attorney, Agent, or Firm*—Michael J. McGowan; Prithvi C. Lall; Michael F. Oglo

[57] ABSTRACT

A system and method for ranking features by exploiting their relationship to the Fisher projection space. The system ranks n features in a feature set using a design set comprising exemplars from each of M possible event classes of an associated feature-based classification system. A training set is created by randomly selecting exemplars from each of the M classes in the design set. A "smoothed" Fisher projection space for the training set is created by replacing the sample means and the within-class sample covariance matrix normally used in deriving a Fisher projection space with expressions for the mean vectors and covariance matrices derived from event class probability density function estimates. The angle between a given feature and the smoothed Fisher projection space is calculated for each feature in the feature set, and the features are then ordered by increasing numerical size of this angle. The system produces a reduced feature set by eliminating those features which are not important for classification based on the linear ranking of the features.

19 Claims, 4 Drawing Sheets

SYSTEM AND METHOD FOR FEATURE SET REDUCTION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to a system and method for feature reduction and interpretation for pattern recognition systems. More specifically, the invention provides a system for ranking features in order of importance and for selecting the features that are important for classification.

(2) Description of the Prior Art

The use of automatic pattern recognition systems for rapid identification and analysis of patterns in input data and for accurate classification of input patterns into one of several predetermined classes is well known in the art. Feature based pattern recognition systems typically use an array of values or measurements defining properties of the input pattern called a feature vector. An input feature vector is compared to a reference set of feature vectors representing the known classes to determine which of the known class feature vectors has the highest similarity to the input feature vector.

When the different event classes have known unique measurable characteristics and features, the classification problem is straightforward. However, for many applications the characteristics of the classes and features that separate the classes are unknown and the feature set designer must determine the features that capture the class differences. This set of available features is the feature set. Selecting the proper feature set is necessary to obtain the most robust classification performance.

Poor feature sets cause a number of difficulties for automatic classification. The use of too few features results in poor classification accuracy. However, using too many features also decreases overall classification accuracy. This counter-intuitive "performance peaking" phenomenon is due to the "curse of dimensionality," and affects all classifiers, whether neural network or classical. Thus, feature reduction, identifying and removing features that do not enhance classification performance, plays an important part in feature set design. Superfluous features contribute "opportunities" for misclassification and should be eliminated to improve system robustness. Furthermore, the complexity and cost of feature measurement systems and pattern recognition systems are directly related to the number of computed features. Consequently, from both a performance and economic perspective, it is important to have effective feature reduction algorithms.

Furthermore, in some applications the pattern recognition systems used exhibit large variations in performance due to differences in input systems, measurement system performance, and the environment (changing noise, light, temperature). Feature sets that work well in one environment may fail miserably in another and cannot form the basis for a robust classification system. Recognition systems used in changing environments or with changing collection mechanisms often require adaptive, in situ, selection of features from a global feature set. Given a list of features that are known to be useful in certain situations, adaptive feature selection from the list of features is indistinguishable from feature reduction as it is used in this application. Clearly, feature reduction algorithms must be computationally fast if adaptive feature selection is to be undertaken in situ.

Although several feature reduction techniques have been developed, they generally suffer from one or more disadvantages which limit their use in many applications. For example, a direct algorithm for obtaining the feature set with the lowest classification error rate (the optimal feature set) is the exhaustive combination method (ECM). ECM examines all possible combinations of features to find the best feature set. Although systems employing ECM will obtain the optimal feature set, they are computationally complex and clearly impractical for most applications unless the number of features is small because the number of possible combinations grows exponentially with the number of features. For example, finding the optimal feature set from a set of 35 features requires examining $2^{35} \cong 3.4 \times 10^{10}$ feature sets, while a set of 70 features requires examining $2^{70} \cong 1.2 \times 10^{21}$ feature sets.

Another technique, single feature classification performance ordering (SFCPO), linearly orders individual features by classification performance when each feature is used alone. This ordering is easily thresholded for various purposes, including feature reduction. SFCPO is good at optimizing classification performance, and it is not limited by severe computational complexity or overhead. However, SFCPO does not provide any intuitive interpretations that facilitate understanding of or provide insight to the reduction or classification problem.

Another commonly used method of feature reduction is attributed to R. A. Fisher. Fisher's method derives a new set of features that are linear combinations of the original features. The span of these newly derived features is called the multiclass Fisher projection space (FPS). The FPS maximally separates the class means relative to the class variances. This geometric interpretation greatly facilitates intuition and strongly indicates that the FPS is a good space for feature reduction. Additionally, if the classes are linearly separable in the FPS, Fisher's linear discriminator, defined on the FPS, can be used for classification. However, the use of the FPS does not guarantee linear separability.

Although Fisher's method is computationally fast, it does not linearly order the individual features in terms of their relative importance to classification. Additionally, the FPS is unlikely to contain any of the original features in its span, and thus, features that have natural interpretations may not be readily interpreted if they have been modified.

Thus, what is needed is a system for feature reduction that linearly ranks features in terms of their importance to classification based on the original features relationship to the FPS. Such a system would provide intuitive interpretations that facilitate problem understanding and insight while maintaining the natural interpretation of the original features.

SUMMARY OF THE INVENTION

Accordingly, it is a general purpose and object of the present invention to provide a system and method for linearly ranking features in order of importance.

Another object of the present invention is the provision of a system and method for feature reduction.

A further object of the present invention is to provide a feature ranking and reduction system that supports adaptive optimization of an automatic classification system.

Yet another object of the present invention is to provide a system for feature ranking and/or reduction which does not call for relatively complex and/or extensive computations or relatively large storage requirements.

Yet a further object of the present invention is the provision of a system and method for feature ranking and/or reduction which preserves the natural interpretation of the original features and supports intuitive interpretations facilitating problem understanding and insight.

Still another object of the present invention is the provision of a system and method for feature ranking and/or reduction that reconciles multiple feature rankings.

These and other objects made apparent hereinafter are accomplished with the present invention by providing a system for ranking features by exploiting their relationship to the Fisher projection space. The system ranks the n features in a feature set using a set of exemplars wherein each exemplar corresponds to one of the M event classes of an associated feature-based classification system. The system uses a feature extractor to produce an n-element feature vector for each exemplar and build a design set comprising the n-element feature vectors. A training set compiler creates a training set by randomly sampling feature vectors from the design set. A projection space processor then generates the smoothed Fisher projection space (SFPS) for the training set. A feature ranking processor uses the (SFPS) to generate a Procrustes angle for each feature in said feature set and linearly rank the features by numerical size of their respective Procrustes angles. A feature reduction processor eliminates features which are not important for classification based on the linear ranking of the features.

DESCRIPTION OF THE PREFERRED EMBODIMENT

In the embodiments described herein, the method for feature ranking and reduction in accordance with the present invention will be referred to as "Procrustes ordering." In a Procrustes ordering method, individual features are ranked by exploiting their relationship to the Fisher projection space (FPS). The maximal separation property of the FPS provides a good reduced feature space for nonlinear classification problems. However, the FPS is derived from linear combinations of the original features and is unlikely to contain any of the original features in its span. Procrustes ordering maintains the original feature by choosing a subset of the original feature set that best approximates (in the least squares sense) the FPS. As will be readily apparent to those skilled in the art, Procrustes ordering is data based and can be used in conjunction with any feature-based classification pattern recognition method or system. However, Procrustes ordering requires that the classification system have $M \geq 1$ event classes and that the feature set comprise $n \geq 2$ features.

Figure 1:
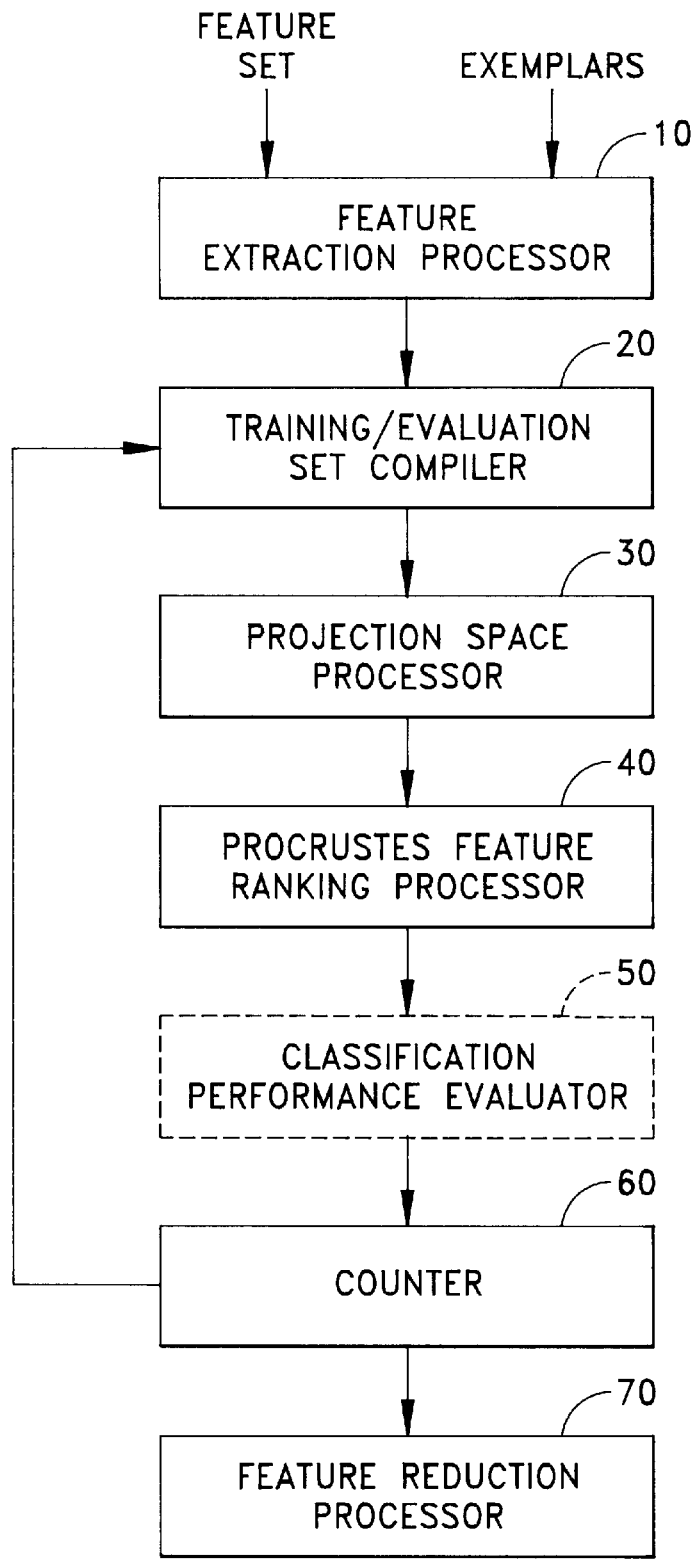
FIG. 1 is a diagram of the functional units of a system for feature ranking and reduction in accordance with the present invention.

Referring now to FIG. 1, there is shown a diagram illustrating the functional units of a system for ranking features in order of importance and for selecting the optimal feature set in accordance with the present invention. The system operates on the feature set and a set of sample input patterns; (exemplars) to produce a reduced feature set. The reduced feature set is the subset of the original feature set that provides the most robust classification performance. The features (real-valued functions of the data defined to measure class specific properties) comprising the feature set can be defined using any conventional method that is consistent with the classification pattern recognition system for which the feature set is designed.

In FIG. 1, a feature extraction processor 10 operates to compile and collect the data necessary for Procrustes ordering. Feature extraction processor 10 acquires exemplars (samples) for each event class and extracts a feature vector from each of the exemplars. The feature vectors are compiled into a design set. Each feature vector comprises n feature values, one for each of the n features in the feature set.

Training/evaluation set compiler 20 creates a training set and, optionally, an evaluation set by sampling the design set compiled by feature extraction processor 10. A projection space processor 30 produces a reduced feature space that is a subset of the original n-dimensional feature space. The reduced feature space can be generated using several known methods such as principal component analysis, factor analysis, Fisher's method, or the like. Similarly, a variation of Fisher's method (referred to herein as "Smoothed Fisher") in which the sample means and the within-class sample covariance matrix of Fisher's method are replaced with mean vectors and covariance matrices derived from event class probability density function estimates can be used to derive a reduced feature space (referred to herein as "Smoothed Fisher Projection Space" (SFPS)) from the training set.

Feature ranking processor 40 calculates the Procrustes angle, the angle between a given feature and the reduced feature space, for each feature in the feature set. Processor 40 then generates a Procrustes ranking by ordering the features by increasing numerical size of their Procrustes angles. An optional classification performance evaluator 50 evaluates the performance of the classification system under the Procrustes ranking using the evaluation set built by compiler 20. However, classification performance evaluator 50 has a broken line in FIG. 1 because the evaluator is an optional element of the present invention and be omitted if a desired application does not require its use.

Counter 60 counts the number of ranking trials performed to ensure that a sufficient number of ranking trials have been performed to satisfy a confidence interval criteria. A trial is defined as a ranking of features by feature ranking processor 40 for a single training set.

Feature reduction processor 70 operates on the feature ranking(s) derived by Procrustes feature ranking processor 40 to select the subset of features that are important for classification (the Procrustes reduced feature set). Feature reduction processor 70 combines the Procrustes rankings from processor 40 and generates a Procrustes reduced feature set by identifying the subset of features that are consistently highly ranked. Alternatively, a reduced feature set can be created by eliminating those features having a Procrustes angle greater than a threshold (decision confidence) angle.

Figure 2:
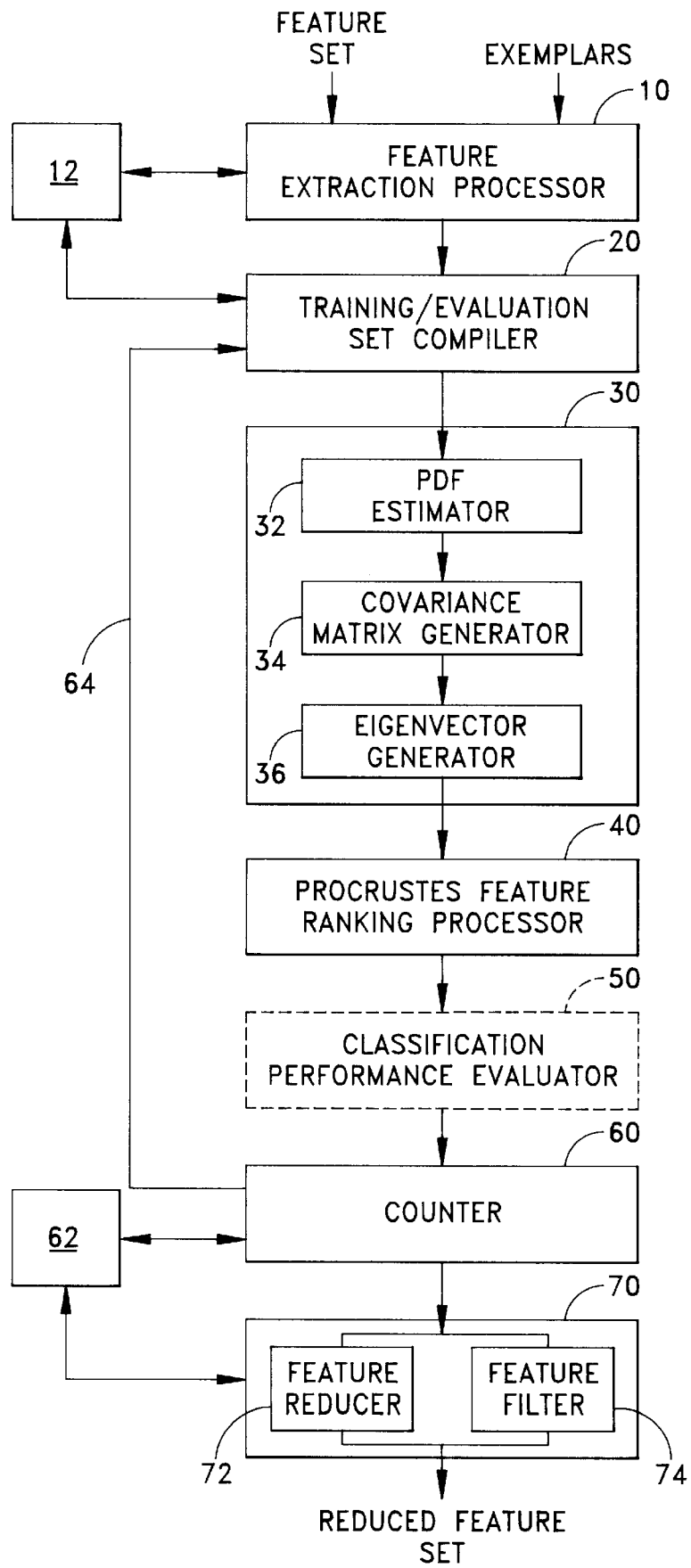
FIG. 2 is a block diagram illustrating a system for feature ranking and reduction in accordance with the present invention.

The present invention is shown more particularly in FIG. 2, in which is shown a block diagram illustrating a system for feature ranking and reduction in accordance with the present invention. In FIG. 2, feature extraction processor 10 acquires the feature set to be reduced and a set of exemplars for the different event classes. Preferably, the exemplars are obtained from the measurement system (not shown) of the automatic pattern classification system.

The measurement system provides a means for sampling the input data to be classified and converting the data into a form for further processing. For example, in a recognition system for classifying acoustic signals, the measurement system (e.g., transducer array and acoustic signal processor) receives the acoustic signal and converts it into a digital representation of the signal. In such a system, the features used to define event classes may include frequency, signal to noise ratio, coherence, beam pattern, beam width, array gain, pulse length, or noise spectral density. Similarly, in a character recognition system, the measurement system, which can be a digital scanner, images the unknown (input) characters and stores the image in a digital format.

Feature extraction processor 10 is programmed to extract an n-element feature vector from each of the exemplars received. The n feature values of the feature vector are generated according to the features defined within the feature set. Feature extraction processor 10 compiles the feature vectors into a design set stored in storage unit 12. Storage unit 12 which can be random access memory, a magnetic storage device, or the like is a shared storage device accessible to both feature extraction processor 10 and training/evaluation set compiler 20.

In a preferred embodiment, feature extraction processor 10 builds a labeled design set (the event class for each exemplar is known) having at least two exemplars for each event class. Building a labeled design set permits evaluation of individual Procrustes ranking trials and comparison of reduced feature sets. Additionally, having at least two exemplars for each event class enables disjoint training and evaluation sets to be built.

After feature extraction processor 10 produces a feature vector for each of the exemplars, the processor supplies a control signal to training/evaluation set compiler 20. When training/evaluation set compiler 20 receives the control signal from feature extraction processor 10, compiler 20 builds a training set and, optionally, an evaluation set by sampling the exemplars in the design set compiled by feature processor 10. Compiler 20 builds an evaluation set if the performance of the Procrustes ranking for that training set will be evaluated by performance evaluator 50.

In a preferred embodiment, the design set is labeled and the training and evaluation sets are created by uniformly randomly sampling a subset of the exemplars from each of the event classes to create disjoint training and evaluation sets. The training and evaluation sets should contain at least one exemplar from each of the event classes. If the design set is not labeled, a training set is compiled by sampling the entire design set. After compiling the training set and, if necessary, the evaluation set, compiler 20 notifies projection space processor 30 that a training set has been built.

Projection space processor 30 comprises a probability density function (PDF) generator 32, a covariance matrix generator 34, and an eigenvector generator 36. Preferably, processor 30 produces a reduced feature space by deriving a Smoothed Fisher Projection Space (SFPS) for the training set built by compiler 20. The SFPS is based on a variation of Fisher's method, a well known feature reduction method attributed to R. A. Fisher. Fisher's method derives a new set of features that are linear combinations of the original features. The span of these derived features is defined as the multiclass Fisher projection space. The FPS maximally separates the class means relative to the class variances. This geometric interpretation facilitates intuition and the maximal separation property of the FPS suggests that it is a good reduced feature space for nonlinear classification problems. A detailed description of Fisher's method can be found in R. O. Duda and P. E. Hart, PATTERN CLASSIFICATION AND SCENE ANALYSIS, (Wiley & Sons 1973) pp. 114–123 incorporated herein by reference.

The usual formulation of Fisher's method uses sample means for each class and a (pooled) within-class sample covariance matrix. To derive a SFPS, a probability density function (PDF) is estimated for each of the event classes using the feature vectors compiled in the training set. Expressions for mean vectors and covariance matrices of these estimated class PDFs are then used in Fisher's method to define a SFPS. The SFPS is preferred over the FPS because smoothing the feature vectors in the manner described reduces the effects of outliers on the SFPS.

PDF generator 32 generates an estimated PDF for each of the event classes using the feature vectors from the training set built by compiler 20. Any valid PDF estimation technique can be used to obtain the estimated PDFs. In a preferred embodiment, PDF generator 32 is programmed to generate the PDFs by estimating the unknown PDFs as a mixture of Gaussian PDFs. This generation technique is preferred because it is applicable both for event classes that are well represented and those that are poorly represented. A detailed discussion of this estimation technique can be found in R. L. Streit and T. E. Luginbuhl, *Maximum Likelihood Training of Probablistic Neural Networks*, IEEE Transactions on Neural Networks, vol. 5, no. 5, September 1994, pp. 764–783, incorporated herein by reference.

It should be noted that the above technique uses a homoscedastic mixture (that is, common covariance for all mixture components) of Gaussian PDFs to estimate the unknown class PDFs. However, if there is enough data in the training set to estimate class specific covariance matrices, the above technique can be extended to use a heteroscedastic mixture (that is, different covariance matrices for each component in each class).

Additionally, it should be noted that when an unlabeled training set is used, an overall likelihood function is estimated rather than estimating PDFs for each of the event classes. The overall PDF can be estimated using common clustering techniques.

After the estimated PDFs are generated, covariance matrix generator 34 generates the within-class scatter matrix, $\Sigma_w$, and the between-class scatter matrix, $\Sigma_b$, using the estimated PDFs generated by PDF generator 32. If $p_j(X)$ denotes the estimated PDF for the $j^{th}$ class, covariance matrix generator 34 can be programmed to generate the within-class scatter matrix, $\Sigma_w$, and the between-class scatter matrix, $\Sigma_b$, using the known general formulas:

$$\sum\nolimits_w = \sum_{j=1}^{M} \alpha_j \int_{-\infty}^{\infty} (X-\mu_j)(X-\mu_j)^t p_j(X) dX \text{ and} \tag{1}$$

$$\sum\nolimits_b = \sum_{j=1}^{M} \alpha_j \int_{-\infty}^{\infty} (X-\mu)(X-\mu)^t p_j(X) dX \tag{2}$$

where $\mu_j$ is the mean of the estimated PDF, $p_j(X)$, for class j and is given by $$\mu_j = \int_{-\infty}^{\infty} X p_j(X) dX \quad (3)$$

and $\mu$ is the global mean defined by $$\mu = \sum_{j=1}^{M} \alpha_j \int_{-\infty}^{\infty} X p_j(X) dX. \quad (4)$$

In the equations, $\alpha_j$ represents the mixing proportion of the mixture associated with class j, superscript t denotes the vector/matrix transpose, and X represents the feature vector.

Having obtained the smoothed mean vectors and covariance matrices, the SFPS can be defined. By Fisher's method, maximizing the between-class to within-class scatter matrices, requires maximizing the Rayleigh quotient given by $$J(w) = \frac{w^t \Sigma_b w}{w^t \Sigma_w w} \quad (5)$$

where $w \in R^n$ ($R^n$ denoting the n-dimensional set of real numbers). Maximizing $J(w)$ is equivalent to solving the generalized eigenvalue problem $$\Sigma_b w = \lambda \Sigma_w w \quad (6)$$

where $\lambda$ and $w$ denote the eigenvalue and the eigenvectors in the generalized eigenvalue problem of equation (6).

Eigenvector generator 36 uses the within-class scatter matrix, $\Sigma_w$, and the between-class scatter matrix, $\Sigma_b$, generated by covariance matrix generator 34 to generate the eigenvectors, that define the SFPS. In a preferred embodiment eigenvector generator 36 is programmed to generate the eigenvectors defining the SFPS by forming the Cholesky decomposition of $\Sigma_w$ given by $$\Sigma_w = LL^t \quad (7)$$

where L is a lower triangular matrix and superscript t denotes the vector/matrix transpose. Substituting the Cholesky decomposition into equation (6) gives $$\Sigma_b w = \lambda LL^t w \quad (8)$$

which expands to $$\Sigma_b L^{-t}(L^t w) = \lambda L(L^t w). \quad (9)$$

By defining $y = L^t w$ (i.e., forward transform or rotation of the original eigenvectors) and $C = L^{-1} \Sigma_b L^{-t}$, equation (9) reduces to familiar eigenproblem given by $$Cy = \lambda y. \quad (10)$$

From equation (10) the singular value decomposition of C, $C = U \Sigma V^t$, can then easily be computed. The eigenvectors of C are the columns of V. Assume $p \geq 1$ singular values are non-zero, if $W_i$ denotes column i of V, then a $n \times p$ matrix, $\tilde{W}$, whose columns are the non-zero eigenvectors that define the SFPS, is given by $$\tilde{W} = [W_1 W_2 \ldots W_p] \in R^{n \times p}. \quad (11)$$

It should be noted that the $p \times p$ matrix, $\tilde{W}^t \tilde{W}$, is the identity matrix, $I^{p \times p}$, because the columns of $\tilde{W}$ are orthonormal.

It should be apparent to those skilled in the art that there are at most $M-1$ non-zero eigenvalues of the generalized eigenproblem given in equation (6). The span of the eigenvectors corresponding to the largest p, $1 \leq p \leq M-1$, non-zero eigenvalues is the smoothed Fisher projection space of dimension p, denoted SFPS(p). The rank of the SFPS(p) is exactly p because the eigenvectors spanning SFPS(p) are linearly independent. Although the preferred SFPS(p) is the one resulting from the largest dimension, SFPS(M-1), the Procrustes ordering can be defined for every SFPS(p), for $p = 1, 2, \ldots, (M-1)$. Thus, the dimension p of the SFPS(p) will be suppressed, and SFPS(p) will be written as SFPS.

Having generated the eigenvectors that define the reduced feature space, processor 30 passes the eigenvectors to feature ranking processor 40. When processor 40 receives the eigenvectors, the processor generates a Procrustes angle for each feature in the feature set then ranks the features by increasing numerical size of their Procrustes angles.

The cosine of the angle, $\phi$, between an arbitrarily specified non-zero vector, $x \in R^n$, and the SFPS can be defined relative to the original coordinate axes or to the coordinate axes defined by the SFPS. The two methods differ by a linear transformation, $L^t$, where L is the Cholesky factor of the "within-class" scatter matrix, $\epsilon_w$, (recall the forward transform performed in generating the eigenvectors defining the SFPS). Preferably, the angle relative to the SFPS is used because this angle allows for determining a threshold angle for significant features. A complete description of the determination of a threshold angle is described below in reference to feature reduction processor 70.

The Procrustes angles for each feature can be calculated by projecting the features onto the p-dimensional SFPS and measuring the angle between the feature and the projection. To determine the Procrustes angle, the original features axis must be rotated since it was necessary to rotate (forward transform) the eigenvectors, w, to solve the generalized eigenvalue problem given in equation (6). The original features axis can be rotated by multiplying by the Cholesky factor of the within-class scatter matrix defined in equation (7). Let $x_j$ be the $j^{th}$ feature, that is, $x_j = f_j \equiv (0, \ldots, 0, 1, 0, \ldots, 0)^t$. Rotating the feature axis yields $$\tilde{x}_j = L^t x_j \quad (12)$$

where $L^t$ is obtained from the Cholesky decomposition given in equation (7).

Using a least squares approach, the projection of $\tilde{x}_j$ onto the column space, $\tilde{W}$, defining the SFPS is given by $$proj_{\tilde{w}} \tilde{x}_j = \tilde{W}(\tilde{W}^t \tilde{W})^{-1} \tilde{W}^t \tilde{x}_j. \quad (13)$$

However, since the matrix, $\tilde{W}^{n \times p}$, is orthogonal, $\tilde{W}^t \tilde{W} = I$, and the projection reduces to $$proj_{\tilde{w}} \tilde{x}_j = \tilde{W} \tilde{W}^t \tilde{x}_j. \quad (14)$$

The angle between any two vectors, a and b, is given by $$\cos\phi = \frac{a^t b}{\|a\|_2 \|b\|_2}. \quad (15)$$

Equation (15) can be used to provide the Procrustes angle for the $j^{th}$ feature, $x_j$, if a denotes the feature vector and b denotes the projection of the feature vector onto the SFPS, that is, $$a = \tilde{x}_j \text{ and} \quad (16)$$

$$b = \tilde{W}\tilde{W}^t \tilde{x}_j. \quad (17)$$

Using equations (16) and (17) allows the following reductions:

$$\|a\|_2 = (\tilde{x}_j^t \tilde{x}_j)^{\frac{1}{2}} \quad (18)$$

$$= ((L^t x_j)^t (L^t x_j))^{\frac{1}{2}} \quad (19)$$

$$= \|L^t x_j\|_2 \quad (20)$$

and $$\|b\|_2 = ((\tilde{W}\tilde{W}^t \tilde{x}_j)^t (\tilde{W}\tilde{W}^t \tilde{x}_j))^{\frac{1}{2}} \quad (21)$$

$$= (\tilde{x}_j^t \tilde{W}\tilde{W}^t \tilde{W}\tilde{W}^t \tilde{x}_j)^{\frac{1}{2}} \quad (22)$$

$$= \|\tilde{W}^t L^t \tilde{x}_j\|_2 \quad (23)$$

Substituting equations (16), (17), (20), and (23) into equation (15) gives the expression for the Procrustes angle, $\phi_j$, between the $j^{th}$ feature, $x_j$, and any non-zero vector in the SFPS. This angle, relative to the SFPS, is defined as $$\phi_j = \cos^{-1}\left\{\frac{\|\tilde{W}^t L^t x_j\|_2}{\|L^t x_j\|_2}\right\}. \quad (24)$$

The Procrustes angle, $\phi_j$, will be uniquely defined if it is restricted to lie between 0 and 90 degrees, and will be the same angle for all vectors in the subspace spanned by $x_j$.

As previously described, the Procrustes ordering of the feature set is defined by ranking the features by increasing numerical size of their Procrustes angles. Procrustes ordering assumes that the SFPS is a good space for feature reduction. Procrustes ordering exploits this property of the SFPS by selecting a subset of the original features that best approximates the SFPS. The Procrustes angle is a measure of linear independence between a feature and the SFPS. If the angle of a particular feature is small (near zero), the feature is nearly in the span of the SFPS; however, if the angle is large (near 90 degrees), the feature is nearly orthogonal to the SFPS. Intuitively, features with small Procrustes angles are good features for classification, whereas, features with large Procrustes angles are poor features for classification. The first feature in the Procrustes ordering, therefore, has the smallest Procrustes angle, and the last feature has the largest angle.

Processor 40 generates the Procrustes angle for each feature ($\phi_j$, for j=1 to n) using equation (24). After generating the Procrustes angle for a feature, the feature and its Procrustes angle are positioned in the Procrustes ranking in accordance with the size of the feature's Procrustes angle.

Classification performance evaluator 50 uses the evaluation set built by compiler 20 to evaluate the performance of the classification system under the Procrustes ranking generated by feature ranking processor 40. Classification evaluator 50 can be programmed to simulate the classification system. Alternatively, classification evaluator 50 can be programmed to initiate the classification system and transfer the appropriate feature set and input vectors to the classification system. Any conventional performance evaluation technique can be used. Preferably, evaluator 50 is used to generate a performance curve based on linear combinations of the features ranked by feature ranking processor 40 to determine the subset that provides the best performance. That is, the Procrustes ordering is sequentially tested (i.e., feature rankings (1), (1, 2), ... (1, 2, ... j), ... (1, 2, ... n)) and the performance (probability of correct classification) is plotted as a function of j, the feature index.

Figure 3:
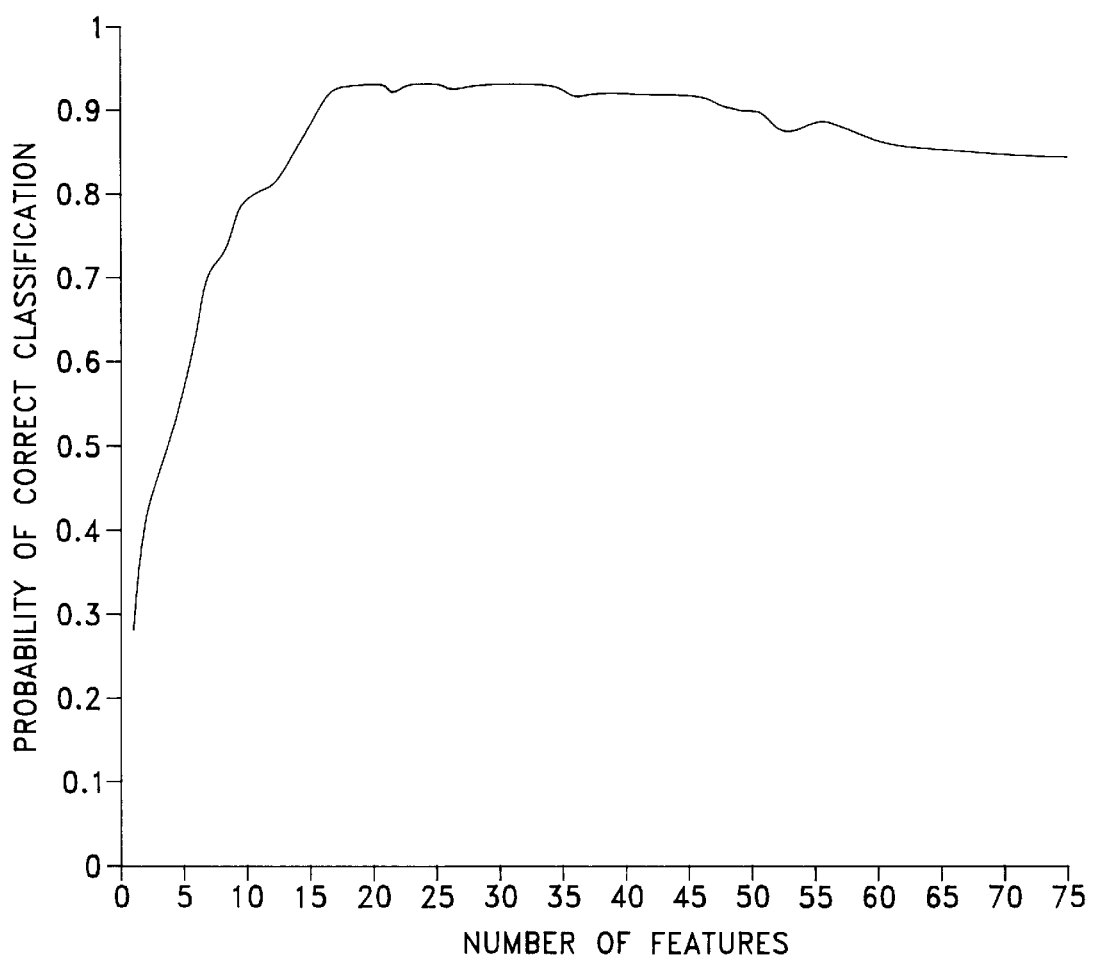
FIG. 3 illustrates a sample performance evaluation plot for a feature set ranked in accordance with the present invention.

FIG. 3 shows a sample performance plot (probability of correct classification vs. number of features). In FIG. 3, the classification performance peaks when 23 features are used and begins to decline when more than 27 features are used; indicating that the reduced feature set should contain between 23 and 27 features. This performance evaluation can be used for comparison against other Procrustes orderings or for comparison with the number of features in the Procrustes reduced feature set derived by feature reduction processor 70. Evaluating classification performance is useful if only a small number of trial rankings will be performed. Evaluating classification performance need not be performed for every Procrustes ranking trial produced by feature ranking processor 40, and the evaluator can be omitted entirely if a desired application does not require it.

Referring again to FIG. 2, counter 60 determines if another Procrustes ordering, based on a different training set, will be performed. Preferably, multiple Procrustes ordering trials are performed to increase the utility of a small design set by exploiting the variability within the design set. Using multiple trials can reduce the bias and variance associated with performance estimates based on a small design set. In choosing the number of ordering trials to perform, consideration should be given to the size of the design set and the processing time available to perform the trials.

Counter 60 receives the Procrustes ranking created by processor 40 and stores the ranking in a Procrustes ranking storage unit 62. Storage unit 62 which can be random access memory, a magnetic storage device, or the like is accessible to both counter 60 and feature reduction processor 70. After receiving the Procrustes ranking for processor 40, counter 60 increments a trial counter and compares the number of ranking trials performed with a predetermined trials run number that identifies the total number of ranking trials to be performed. If more trials are to be performed, counter 60 supplies a control signal 64 to training/evaluation set compiler 20 to initiate the compilation of another training set and, if required, an evaluation set. Preferably, the predetermined trials run number is calculated to ensure that a sufficient the number of ranking trials are performed to satisfy a statistical criteria such as confidence or tolerance intervals.

Feature reduction processor 70 comprises a feature reducer 72 and, optionally, a feature filter 74. Feature reduction processor 70 receives the number of Procrustes ranking trials performed from counter 40. If multiple Procrustes trials were performed, feature reduction processor 70 initiates feature reducer 72. However, if only one Procrustes ranking trial was performed, reduction processor 70 initiates feature filter 74.

When multiple Procrustes ranking trials are performed, feature ranking processor generates a separate Procrustes feature ranking for each trial. These feature rankings may vary from trial to trial. Feature reducer 72 reconciles the multiple trials and generates the Procrustes reduced feature set. The across-trial feature ordering is based on the assumption that the number of times a particular feature is highly ranked is an indication of the relative importance. Feature reducer 72 generates the Procrustes reduced feature set by first combining the multiple Procrustes rankings produced by feature ranking processor 40 and then identifying the features that are consistently highly ranked across the multiple trials.

Figures 4A, 4B:
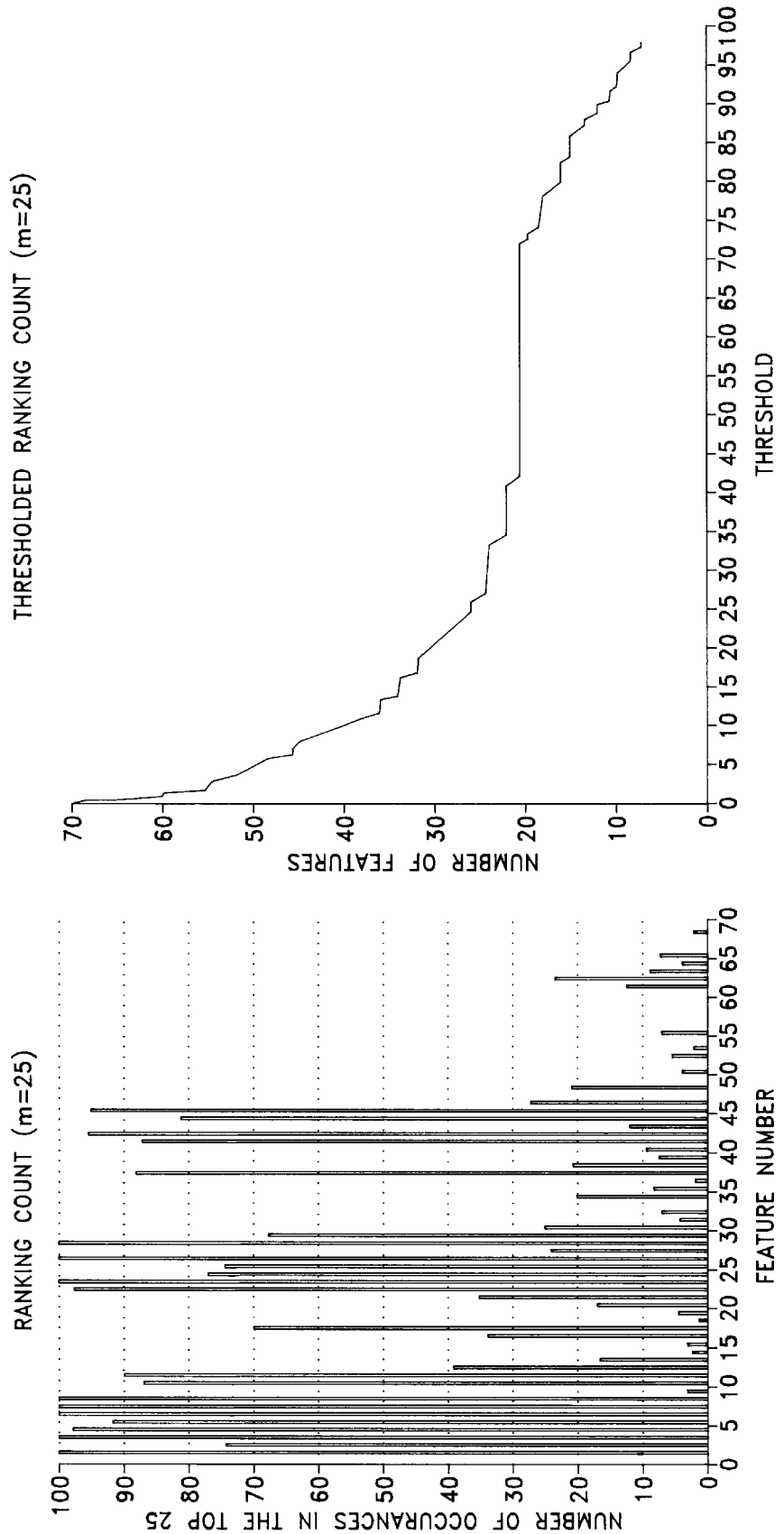
FIG. 4A graphically represents a ranking count for each feature in the feature set.
FIG. 4B graphically illustrates a thresholded ranking count for the ranking count of FIG. 4A.

Feature reducer 72 combines the ranking of features across multiple trials by counting the number of times each feature is ranked in the top n positions; where m=1, 2, . . . , n (number of features). That is, for m=1, feature processor 72 builds a ranking count which indicates a ranking count number for each feature. For m=1 the ranking count number equals the number of times the feature was ranked first. For m=2, feature reducer 72 builds a ranking count in which the ranking count number for each feature indicates the number of times the respective feature was ranked first or second. Feature reducer 72 continues to build these ranking counts until m=n (that is n individual ranking counts are built). Referring to FIG. 4A, there is shown a graphical representation of a ranking count for m=25 calculated from 100 Procrustes ranking trials of a feature set having 70 features. As can be seen in FIG. 4A, eight features (features 1, 3, 6–8, 23, 26, and 28) were ranked in the top 25 positions in each of the 100 trials while 56 features were ranked in the top 25 at least once.

The features that are consistently highly ranked are of most importance for classification Feature reducer 72 identifies the features which are consistently highly ranked by constructing a thresholded version of each ranking count built. A thresholded ranking count is constructed by varying a threshold, T, between 0 and the total number of trials and, for each threshold value, counting the number of features whose ranking count number exceeds the threshold. FIG. 4B shows the thresholded ranking count for the ranking count of FIG. 4A. As can be seen in FIG. 4B, at T=1, the thresholded ranking count indicates that 56 features were ranked in the top 25 at least once, while at T=100, the thresholded ranking count indicates that only eight features were ranked in the top 25 for all 100 trials.

After calculating the thresholded ranking counts, feature reducer 72 separates the features which are consistently highly ranked from those which are only occasionally ranked by examining each thresholded ranking count to determine the longest series of threshold values over which the number of features whose ranking count numbers exceed the threshold values remains constant. This series is illustrated in FIG. 4B by the flat portion of the curve, identified as 40, over a wide range of threshold values (between 40 and 68). Portion 40 of the thresholded ranking curve separates the features consistently highly ranked (feature with a ranking count over 68) from those that are not consistently ranked (ranking count less than 40). It should be noted that it is not a threshold value (40 or 68 in FIG. 4B) that determines whether a feature is considered to be consistently ranked. Rather, it is the flat portion 40 of the curve, which occurs for the same number of features, but over different threshold values, in the other thresholded ranking counts, that indicates the breakpoint between features. This breakpoint defines the features that are important for classification.

The breakpoint identifies a constant number of features whose ranking count number exceeds the threshold value (referred to as the Procrustes number). The Procrustes number indicates the size of the reduced feature set. The features comprising the reduced feature set can be easily identified from the ranking count. For example, the Procrustes number for the thresholded ranking count shown in FIG. 4B is 23. The 23 features that comprise the reduced feature set can easily be identified from the ranking count (FIG. 4A) as the 23 features having the highest ranking count numbers. It should be noted that the Procrustes number may vary from one thresholded ranking count to another. Thus, the Procrustes number that occurs consistently over a number of thresholded ranking counts is used to identify the number of features in the Procrustes reduced feature set.

When multiple trials have not been performed, feature filter 74 generates the Procrustes reduced feature set by eliminating those features having a Procrustes angle greater than a threshold angle. A threshold angle is determined by applying a statistical significance test under an appropriate null hypothesis. To formulate an appropriate null hypothesis, a model for the feature generation process is defined. The model assumes the feature set is comprised of two subsets; a knowledge-based set and an intuition-based set. The knowledge-based set is defined as those features that are derived from known measurable class differences, whereas the intuition based set is comprised of features which are believed to define class differences. For most complex classification problems, the size of the knowledge-based set is small compared to the size of the intuition-based set; therefore, the underlying null hypothesis should be dominated by the intuition based set. Because Procrustes ordering is independent of vector length, the model adopted is that the feature set vectors are uniformly randomly distributed on the unit sphere in $R^n$. With this model, the feature selection process becomes the process of determining the subset of these "randomly" generated features that "happen" to best approximate the SFPS. If these assumptions regarding the feature set are accurate, thresholding the upper tail of the resulting PDF will enumerate those features that are poor for classification.

Let $P_{n,p}(\phi)$ denote the PDF of the Procrustes angle, $\phi$, between a fixed p dimensional subspace of $R^n$ and a uniformly distributed random variable on the unit sphere in $R^n$. It can be shown that the random variable $t=\cos^2\phi$ is beta distributed, with parameters $$\frac{n}{2} \quad \text{and} \quad \frac{(n-p)}{2},$$

so that after a change of variables $P_{n,p}(\phi)$ is given explicitly by $$P_{n,p}(\phi) = \frac{2\Gamma\left(\frac{n}{2}\right)}{\Gamma\left(\frac{p}{2}\right)\Gamma\left(\frac{(n-p)}{2}\right)} \cos^{p-1}\phi \, \sin^{n-p-1}\phi \qquad (25)$$

where $0 \leq \phi \leq \pi/2$ and $\gamma(.)$ represents the Gamma function. Therefore, under a Procrustes ordering method, the angle of a feature is significant at the $\alpha\%$ significance level if it lies on the upper $\alpha\%$ tail of $P_{n,p}(\phi)$.

Feature filter 74 eliminates those features having a Procrustes angle greater than a predetermined threshold wherein the threshold is chosen to provide a predetermined significance level (decision confidence) in accordance with equation (25). The remaining features comprise the Procrustes reduced feature set.

In addition to single trials, feature filter 74 is useful for creating a reduced feature set when a small number of trials have been run. Additionally, filter 74 may be used for comparison against the reduced feature set generated by feature reducer 74 or against the reduced feature set suggested by performance evaluator 50.

What has thus been described is a system and method for ranking features and reducing the number of features used in a real-time feature based classification system. The present invention provides a novel approach for ranking features in order of importance and for reducing the size of a feature set and offers several significant advantages over the prior art. First, Procrustes ordering is fast and computationally simple enabling its use for real-time, in situ applications. Second, it provides geometric insight into the problem of feature selection while maintaining the original interpretation of the given features.

Obviously many modifications and variations of the present invention may become apparent in light of the above teachings. For example, various feature space reduction techniques including, but not limited to, principal component analysis or factor analysis can be used to generate the reduced feature space. The features can then be linearly ranked and reduced based on the angle between the feature and the reduced feature set. Similarly, other statistical models and analysis methods may be used to combine the individual trial rankings into the single across-trial reduced feature set generated by feature reducer 72.

The elements in the embodiment of the system shown in FIG. 2 can be implemented using a combination of computer-readable memory (e.g., EPROM) and combinatorial logic to rank features and/or generate a reduced feature set. Alternatively, the system can comprise software modules of a digital processing program stored in computer-readable memory under control of a digital processor that can be used to direct the processor to generate a reduced feature set and/or rank feature.

In light of the above, it is therefore understood that within the scope of the appended claims, the invention may be practiced otherwise than as specifically described.

What is claimed is:

1. A system for automatic pattern classification by ranking features within a feature set using a computer readable memory and processing capabilities, said system comprising:

a feature extractor, connected to receive a plurality of exemplars, for producing an n-element feature vector for each one of said plurality of exemplars, said n-element feature vectors comprising a design set;

a training set compiler, connected to receive said design set, for creating a training set;

a projection space processor, connected to receive said training set created by said training set compiler, for generating a reduced feature space for said training set; and a Procrustes feature ranking processor, connected to receive reduced feature space, for determining a Procrustes angle for each feature in said feature set, wherein said Procrustes angle is the angle between said feature and its projection onto said reduced feature space, and for linearly ranking said features in increasing numerical size of their respective Procrustes angle, wherein said linearly ranked features comprise a ranked feature set.

2. The system of claim 1 further including a feature reduction processor, connected to receive said ranked feature set, for generating a reduced feature set.

3. The system of claim 2 wherein said reduced feature space comprises a Fisher projection space (FPS), said Fisher projection space being defined by a plurality of eigenvectors.

4. The system of claim 3 further including a counter, connected to receive said Procrustes ranking, for retaining said Procrustes ranking and for instructing said training set compiler to create another training set until the number of Procrustes rankings generated by said Procrustes feature ranking processor equals a predetermined trials run number.

5. The system of claim 4 wherein said feature reduction processor comprises a feature reducer for combining said Procrustes rankings and for generating said reduced feature set.

6. The system of claim 5 further including a performance evaluator, connected to receive said Procrustes ranking from said Procrustes feature ranking processor, for evaluating the classification performance of a feature-based classification system.

7. The system of claim 6 wherein said feature reduction processor further comprises a feature filter for eliminating features having a respective Procrustes angle greater than a threshold value.

8. The system of claim 1 wherein said reduced feature space comprises a smoothed Fisher projection space (FPS), said smoothed Fisher projection space being defined by a plurality of eigenvectors.

9. The system of claim 8 wherein said Procrustes feature ranking processor generates a plurality of ranked feature sets, each of said ranked feature sets being generated from a different smoothed Fisher projection space.

10. The system of claim 9 further including a feature reducer, connected to receive said plurality of ranked feature sets, for generating a reduced feature set from said plurality of ranked feature sets.

11. The system of claim 8 further including a feature filter for eliminating features having a respective Procrustes angle greater than a threshold value.

12. A method of ranking features within a feature set used with an automatic pattern classification system having M exclusive event classes using a computer readable memory and processing capabilities, said method comprising the steps of:

using a measurement system of said automatic classification pattern system to acquire a plurality of exemplars;

producing an n-element feature vector for each one of said exemplars, said n-element feature vectors comprising a design set;

creating a training set by randomly sampling said design set, said training set comprising a subset of said design set;

generating a reduced feature space using said n-element feature vectors comprising said training set;

determining a Procrustes angle for each feature in said feature set, wherein said Procrustes angle is the angle between said feature and its projection onto said reduced feature space; and ranking said features by linearly ordering said features in increasing numerical size of their respective Procrustes angle, wherein said linearly ranked features comprise a ranked feature set.

13. The method of claim 12, further comprising the step of eliminating features having a distribution value greater than a threshold value, said threshold value being chosen to provide a predetermined significance level, wherein said distribution value is given by $$P_{n,p}(\phi) = \frac{2\Gamma\left(\frac{n}{2}\right)}{\Gamma\left(\frac{p}{2}\right)\Gamma\left(\frac{n-p}{2}\right)} \cos^{p-1}\phi \sin^{n-p-1}\phi$$

where $0 \leq \phi \leq \pi/2$ is the Procrustes angle associated with said feature, $\gamma(.)$ represents a Gamma function, n is the number of features in the feature set, and p is the dimension of a smoothed Fisher projection space.

14. The method of claim 13 where said step of generating a reduced feature space comprises the steps of:

generating an estimated probability density function for each of the M event classes using said n-element feature vectors comprising said training set;

generating a within-class scatter matrix, $\epsilon_w$, and a between-class scatter matrix, $\epsilon_b$, wherein said within-class scatter matrix is given by the equation $$\sum_w = \sum_{j=1}^{M} \alpha_j \int_{-\infty}^{\infty} (X - \mu_j)(X - \mu_j)^t p_j(X) dX$$

where $p_j(X)$ is an estimated probability density function for class j, $\alpha j$ represents a mixing proportion associated with class j, superscript t denotes the vector/matrix transpose, and $\mu_j$ is a mean of said estimated probability function for class j and is given by $$\mu_j = \int_{-\infty}^{\infty} X p_j(X) dX$$

and wherein said between-class scatter matrix is given by the equation $$\sum_b = \sum_{j=1}^{M} \alpha_j \int_{-\infty}^{\infty} (X - \mu)(X - \mu)^t p_j(X) dX$$

where $\mu$ is a global mean given by the equation $$\mu = \sum_{j=1}^{M} \alpha_j \int_{-\infty}^{\infty} X p_j(X) dX;$$

and generating eigenvectors defining said smoothed Fisher projection space by solving a generalized eigenvalue problem given by $\epsilon_b w = \lambda \epsilon_w w$ wherein the eigenvectors, w, define the smoothed Fisher projection space.

15. The method of claim 14 further including the steps of:

creating an evaluation set by randomly sampling said design, wherein said evaluation set comprises a subset of said design set and wherein said evaluation set and said training set are disjoint; and evaluating the performance of said classification system, using said evaluation set as input to said classification system, to determine a subset of said ranked feature set having the highest classification performance.

16. The method of claim 12 wherein said steps of creating a training set, generating a reduced feature space, determining a Procrustes angle for each feature in said feature set, and ranking said features are repeated a predetermined number of times to generate a plurality of ranked feature sets; and further including the step of reconciling said plurality of ranked feature sets to generate a reduced feature set.

17. The method of claim 16 wherein said step of generating a reduced feature space generates a smoothed Fisher projection space.

18. The method of claim 16 wherein said step of generating a reduced feature space generates a Fisher projection space.

19. A method of ranking features within a feature set used with an automatic pattern classification system having M exclusive event classes using a computer readable memory and processing capabilities, said method comprising the steps of:

using a measurement system of said automatic classification system to acquire a plurality of exemplars;

producing an n-element feature vector for each one of said exemplars, said n-element feature vectors comprising a design set;

creating a training set by randomly sampling said design set, said training set comprising a subset of said design set;

generating a smoothed Fisher projection space using said n-element feature vectors comprising said training set;

determining a Procrustes angle for each feature in said feature set, wherein said Procrustes angle is the angle between said feature and its projection onto said smoothed Fisher projection space;

ranking said features by linearly ordering said features in increasing numerical size of their respective Procrustes angle, wherein said linearly ranked features comprise a ranked feature set;

retaining said ranked feature set;

repeating said steps of creating a training set, generating a smoothed Fisher projection space, determining a Procrustes angle for each feature in said feature set, ranking said features, and retaining said ranked feature set a predetermined number of times to generate a plurality of ranked feature sets;

determining a ranking count from said ranked feature sets;

constructing a thresholded ranking count for said ranking count;

determining a breakpoint in said thresholded ranking count and identifying a Procrustes number associated with said breakpoint; and compiling a reduced feature set, said reduced feature set comprising a number of features equal to said Procrustes number.

* * * * *